United States Patent [19]

Christiansen et al.

[11] Patent Number: 5,717,952
[45] Date of Patent: Feb. 10, 1998

[54] DMA CONTROLLER WITH MECHANISM FOR CONDITIONAL ACTION UNDER CONTROL OF STATUS REGISTER, PRESPECIFIED PARAMETERS, AND CONDITION FIELD OF CHANNEL COMMAND

[75] Inventors: Kevin M. Christiansen, Saratoga; David V. James, Palo Alto; Bruce E. Eckstein, Cupertino, all of Calif.

[73] Assignee: Apple Computer, Inc., Cupertino, Calif.

[21] Appl. No.: 340,248

[22] Filed: Nov. 16, 1994

[51] Int. Cl.$^6$ .................................. G06F 13/00
[52] U.S. Cl. ........................................ 395/842
[58] Field of Search ............ 364/242.3, 242.31; 395/842–848

[56] References Cited

U.S. PATENT DOCUMENTS

| | | | |
|---|---|---|---|
| 4,635,191 | 1/1987 | Boning | 395/842 |
| 4,805,137 | 2/1989 | Grant et al. | 395/287 |
| 4,920,483 | 4/1990 | Pogue et al. | 395/421.09 |
| 5,077,664 | 12/1991 | Taniai et al. | 395/842 |
| 5,111,425 | 5/1992 | Takeuchi et al. | 395/842 |
| 5,119,487 | 6/1992 | Taniai et al. | 395/842 |
| 5,163,131 | 11/1992 | Row et al. | 395/200.01 |
| 5,212,795 | 5/1993 | Hendry | 395/848 |
| 5,235,693 | 8/1993 | Chinnaswamy et al. | 395/486 |
| 5,251,312 | 10/1993 | Sodos | 395/844 |

*Primary Examiner*—Jack B. Harvey
*Assistant Examiner*—Sumati Lefkowitz
*Attorney, Agent, or Firm*—Mark A. Aaker

[57] ABSTRACT

A DMA controller capable of conditional action under the control of a status register, prespecified parameters, and a condition field of the channel command, and a DMA controller which returns status information to command entry locations that are reserved for this purpose are disclosed. The prespecified parameters may be held in a register having a mask field and a value field, and a test for conditional action may be a masked comparison of the status register and the value field. The condition field determines how the test result is interpreted and allows suppressing or forcing the conditional action during a command.

4 Claims, 14 Drawing Sheets

| 4 | 1 | 3 | 2 | 2 | 2 | 2 | 16 |
|---|---|---|---|---|---|---|---|
| cmd | r | key | r | i | b | w | reqCount |
| address ||||||||
| cmdDep ||||||||
| xferStatus |||| resCount ||||

FIG. 6

| 4 | 1 | 3 | 2 | 2 | 2 | 2 | 16 |
|---|---|---|---|---|---|---|---|
| cmd | r | key | r | i | b | w | reqCount |
| address ||||||||
| branchAddress ||||||||
| xferStatus |||| resCount ||||

FIG. 8

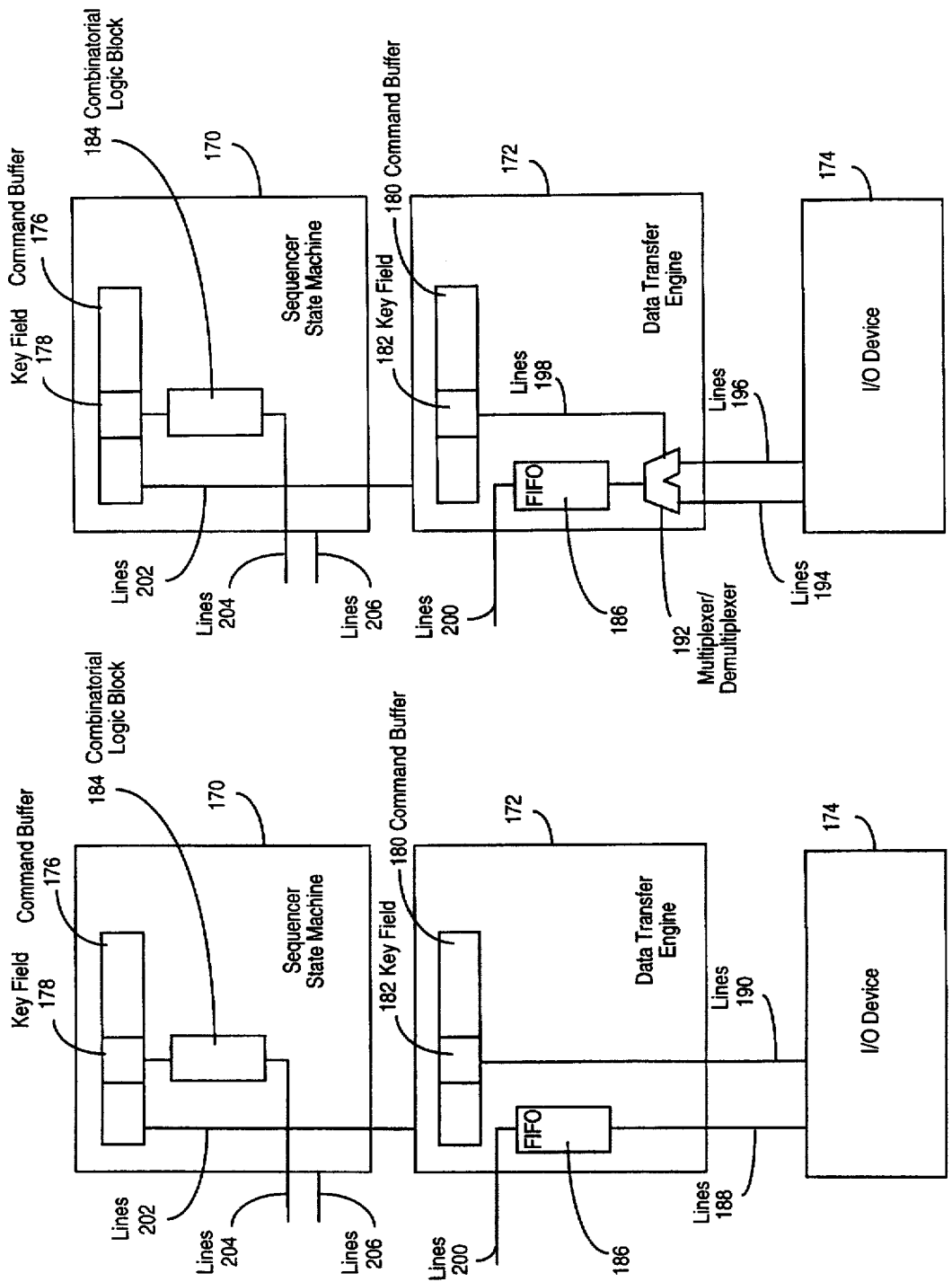

DMA CONTROLLER WITH MECHANISM FOR CONDITIONAL ACTION UNDER CONTROL OF STATUS REGISTER, PRESPECIFIED PARAMETERS, AND CONDITION FIELD OF CHANNEL COMMAND

BACKGROUND OF THE INVENTION

The present invention relates generally to direct memory access (DMA) controllers, and more particularly to a DMA controller having a mechanism for conditional action under the control of a status register, prespecified parameters, and a condition field of the channel command.

DMA is a common method for doing input/output (I/O) on personal computers, minicomputers, and mainframe computers. It permits the transfer of blocks of data without processor intervention, using a separate DMA controller that can gain access to the memory in which the data has been set up in buffers by the host processor. In some implementations, the DMA controller may be controlled by one or more programs that are also set up in the memory by the host processor. Access to the memory occurs through the bus by "stealing" bus cycles from the CPU.

The DMA controller may include one or more channels, each executing its own program and serving one I/O device at a time.

Some of the DMA controllers known heretofore have been capable of taking a conditional action based on a masked comparison of an arbitrary memory-mapped register. All parameters for the comparison were specified in the channel command. These previous controllers suffer from the extra command entry size needed to provide the address, mask, and compare values. In order to mitigate this disadvantage, the conditional action was not provided in all of the channel commands.

Some DMA controllers overwrite their commands, after the commands are executed, with status information. While this allows the DMA controller to continue the program execution without waiting for the processor to read the status information or interrupting the processor, this technique prevents repeated execution of the same command such as when the program flow contains a loop.

Accordingly, an object of the present invention is to provide a DMA controller capable of conditional action under the control of a status register, prespecified parameters, and a condition field of the channel command.

Another object of the present invention is to provide a DMA controller which returns status information to command entry locations that are reserved for this purpose.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the claims.

SUMMARY OF THE INVENTION

The present invention is directed to a DMA controller having at least one Channel. The channel includes a status register and a condition register. The channel also includes a command buffer having a condition field. A combinational logic block has inputs connected to the status register, the condition register and to the condition field and has an output whose value determines the conditional execution of an action by the controller.

The method of the present invention includes reading at least part of a command in system memory having a transfer status field not affecting the execution of the command, executing the command, and writing final status information into the transfer status field in system memory.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

FIG. 6 is a diagram of the format of a command entry.

FIG. 8 is a diagram of the format of the INPUT_MORE, INPUT_LAST, OUTPUT_MORE and OUTPUT_LAST commands.

FIG. 15 is a schematic block diagram of an implementation of the data port selection feature using a sequencer state machine and a data transfer engine suitable for the implementation of the DMA controller of FIG. 13.

FIG. 16 is a schematic block diagram of an alternate implementation of the data port selection feature using a sequencer state machine and a data transfer engine suitable for the implementation of the DMA controller of FIG. 13.

DESCRIPTION OF THE PREFERRED EMBODIMENT

Figure 1:
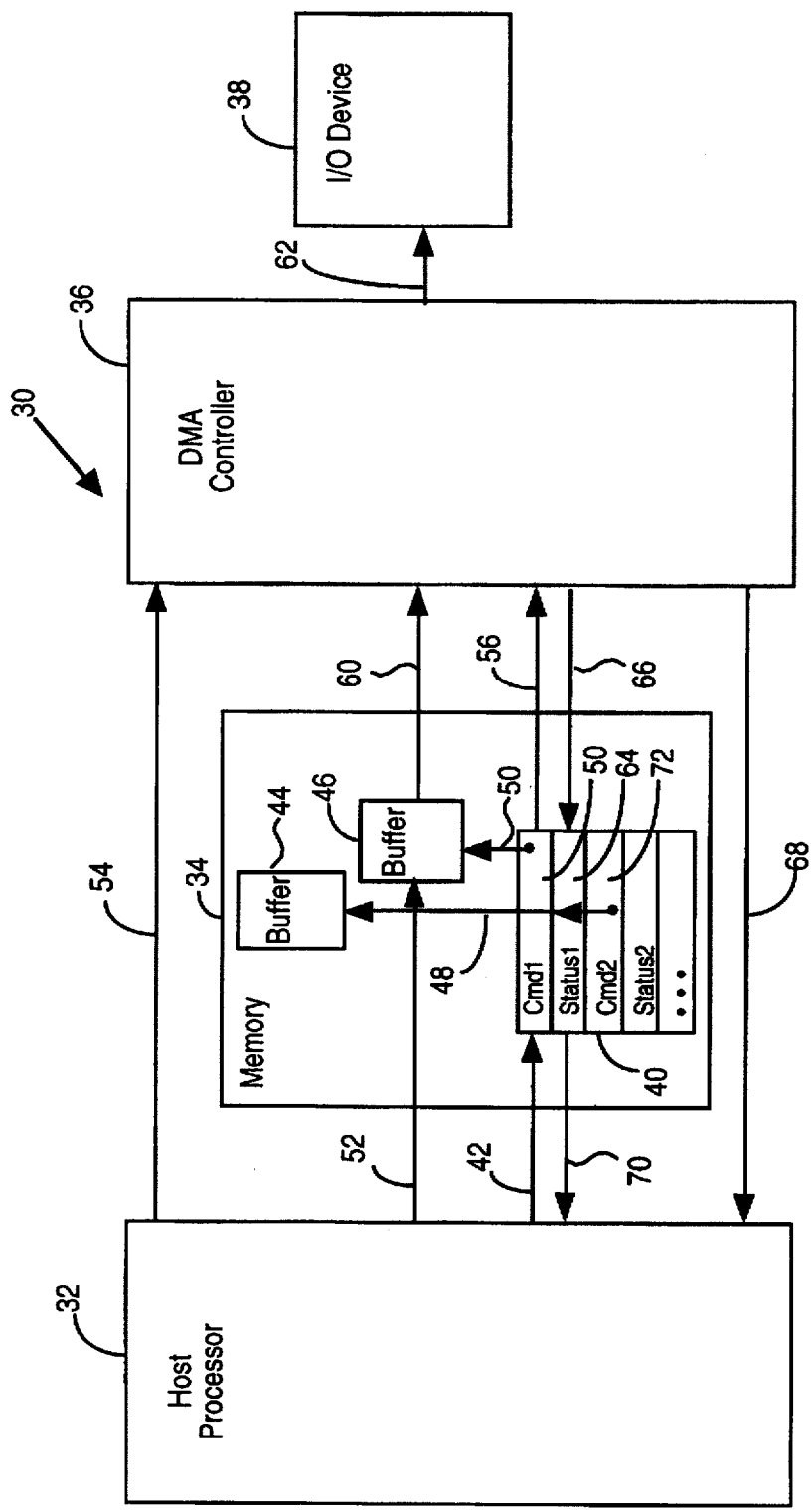
FIG. 1 is a schematic block diagram of a system utilizing a DMA controller according to the present invention.

The present invention will be described in terms of the preferred embodiment. The preferred embodiment is a descriptor based DMA controller and a method for its operation. The term descriptor refers to the DMA command list elements, which are often simply buffer descriptors. The term DMA indicates that data transfers are performed by a relatively simple state machine (called the target) processing commands generated by a relatively sophisticated processor (called the initiator). A system 30 utilizing such a DMA controller is shown in FIG. 1.

System 30 includes initiator or host processor 32, memory 34, target or DMA controller 36 and I/O device 38 such as a disk controller or a network interface. The operations involve the initiator 32, which is a component that has the intelligence to generate commands. In a typical DMA operation, the initiator generates a new list of command descriptors 40 as indicated by arrow 42 and possibly appends them to a pre-existing command list in memory. The command descriptors may refer, as indicated by arrows 48 and 50, to data buffers such as buffers 44 and 46 which contain data to be transferred to and from I/O devices. The buffers are also used by host processor 32 as indicated by arrow 52.

Host processor 32 may send a wakeup signal to DMA controller 36, as indicated by arrow 54. The wakeup signal initiates the DMA controller's processing of the recently-appended commands. Upon receiving the wakeup signal, the DMA controller reads the new commands as indicated by arrow 56, and executes them.

For example, the execution of command 58 requires reading the data in buffer 46 as indicated by arrow 60 and transferring the data to device 38 as indicated by arrow 62. As the command processing continues, the DMA controller returns status to a fixed location within the command entry such as location 64 as indicated by arrow 66 and sends a wakeup signal to the host processor, indicating that another descriptor has been processed, as indicated by arrow 68. The host processor then checks the status information as indicated by arrow 70, while the DMA controller fetches and executes the next command 72.

Each device is typically connected to its own data-transfer channel. The I/O driver software is thus freed of the responsibility of dynamically assigning DMA channels to I/O devices. Two data-transfer channels would typically be assigned to a full-duplex device (such as Ethernet), where data is transmitted simultaneously in both directions; one is sufficient for a half-duplex device (such as a disk controller).

In most cases, the transfer of control information (such as a seek address) is performed before the data transfer is initiated. Similarly, status information (such as short-transfer counts) is returned after the data transfer completes. In both cases, the control, data-transfer, and status information transfers are performed sequentially, so the same DMA channel resources can be shared.

The commands in the device-specific command lists are expected to be used individually to support half-duplex traffic or in pairs to support full-duplex traffic. The commands in these lists are typically transient, in that they are constantly consumed as I/O operations are performed. However, some I/O operations (such as terminal reads or flow-controlled writes) may have an indefinite lifetime.

The descriptor list space 40 is allocated by host processor 32, which fills a set of command-list entries before passing ownership of them to DMA controller 36. DMA controller 36 fetches the command entries and performs the command-entry-specified data-transfer operation, processing command entries until a STOP entry is reached, or an exception condition is detected.

The descriptor list may be structured in several different ways: to loop on itself (a circular queue), to link individual data-transfer operations (linked lists) or to link groups of data-transfer operations (a hybrid approach). Branches may be embedded in most commands. The detailed structure of command lists is dependent on I/O driver software conventions.

Additional commands may be dynamically appended to an existing command list while the previously initiated DMA operations are in progress. Command-list appending is typically performed by creating an additional command list and overwriting the STOP command at the end of the old command list with a branch to the first command of the new list.

A wait field can be used to provide flow-control within a channel. A channel can be programmed to wait until signaled by the processor or by another device.

Figure 2:
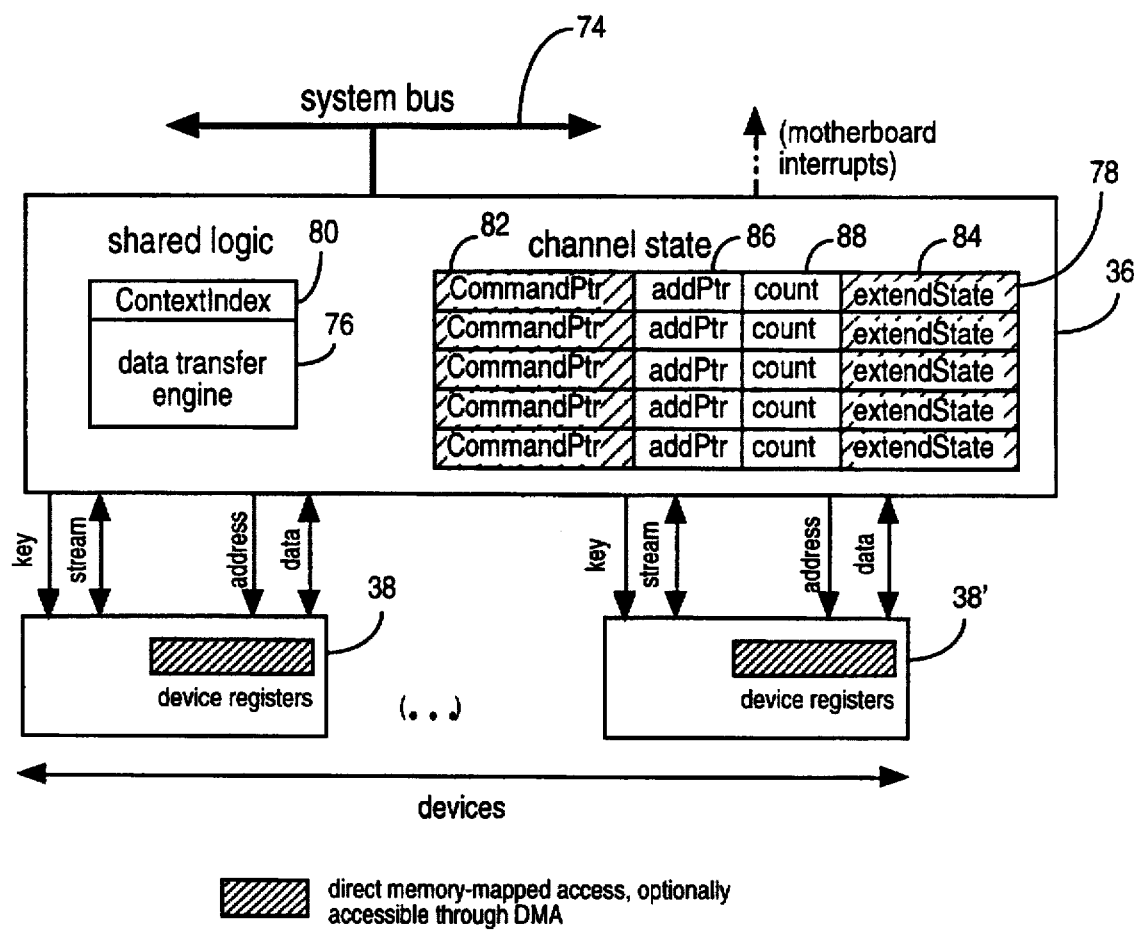
FIG. 2 is a schematic block diagram of a DMA controller according to the present invention.

As shown in FIG. 2, a descriptor based DMA controller 36 is expected to indirectly connect multiple devices 38, 38' to a system bus 74, where the system bus supports read and write transactions to system memory 34 (FIG. 1). Processor interrupts are either generated through special signal wires (for motherboard designs) or by sending wakeup events (a 32-bit write to a prespecified register address). The controller state may have shared state 80 as well as channel state 78 which is replicated for each of the connected devices.

In one style of implementation, hardware may use some form of ContextIndex state 80 to identify which of the DMA contexts is currently active, but this state is not directly or indirectly accessible to software. The data-transfer engine 76 provides the facilities for performing the requested data transfers.

Alternatively, multiple data-transfer engines may operate in parallel, accessing the bus through a bus arbiter. Such an implementation will be described in greater detail.

An I/O device may be connected to a data-byte stream, where the controller handles the movement of these address-less data bytes into or out-of system memory. The controller provides a 3-bit key value as described in greater detail below. Four of the key encodings are used to identify which byte-stream is being used. Typically the standard data stream would be stream 0, and an optional control/status stream would be stream 1.

The controller may support the direct movement of data between device registers and memory. In this case, the controller provides a sequence of device register addresses while the data is being transferred. An additional key encoding is used to identify transfers directed to device registers.

Each channel provides a few memory mapped registers. These registers may include a CommandPtr register 82 (FIG. 2) used to initialize the sequencer's pointer to the command list. When necessary to support 64 bit addressing, this register may be divided into a 32 bit CommandPtrLo register and a 32 bit CommandPtrHi register. Other memory mapped registers will be discussed below.

There are also registers that are not memory mapped, such as addPtr register 86 which holds the address in memory from which data is being read, and count register 88 which holds the amount of data left to be read.

Other registers, some of which are memory mapped, are shown in FIG. 2 as extendState register 84.

An unrecoverable error on a system memory access includes parity and addressing errors. A busy-retry error may be viewed as a recoverable bus error, and may be retried until it completes successfully or the DMA controller's command processing is aborted.

An unrecoverable error sets a dead bit in a ChannelStatus register of the currently executing DMA channel. Software must explicitly reset a run bit of the ChannelStatus register to zero and later set it back to one in order to return to an operational state.

The device's control and status registers may be directly mapped into system memory space, so the processor can directly access them using read and write transactions. For some applications the processor is required to update these registers at the end of every data transfer, so there is no need for the channel program to explicitly return device status. However, some devices have the intelligence to autonomously process multiple data transfer requests. For these applications, processor performance would be impacted unless the channel could autonomously return device status before initiating the next data transfer. A status stream and device status registers are two sources of the returned device status.

If a status stream is used, an additional data-transfer command can be used to transfer a status-byte stream into memory. A unique key value is used to distinguish the status-type stream from the normal data-transfer stream.

If status registers are used, an additional data-transfer command can be used to transfer the values of a range of device register addresses into memory. Another unique key value may be used to distinguish this memory-mapped transfer from the normal data-transfer stream. However, it is preferable that specialized commands such as LOAD_QUAD and STORE_QUAD described below be used for this purpose. These commands eliminate the requirement for an additional set of address registers.

As described below, the INPUT, OUTPUT and NOP commands specify a condition and an address for an optional branch in command sequencing. A similar mechanism is used to specify conditional interrupt generation and conditional suspension of command processing.

The DB DMA Controller Architecture has two components that may be directly visible to the processor. There is a linear array of channel registers and there may be a linear array mapping directly to the supported device registers. The base addresses of these data structures are defined by the affiliated bus standard, or within a ROM data structure whose format is specified by the affiliated bus standard, or in the case of a motherboard implementation, in the chip or system specification.

Each channel contains a set of registers which can be accessed directly through the system address space as well as indirectly through commands such as STORE_QUAD and LOAD_QUAD as discussed below. Several of these registers are optional, and serve as extensions to the functionality provided in the basic channel commands. Table 1 illustrates the offset for each of the channel registers. This offset appears literally in the Command.address field discussed below when the register is accessed indirectly. When accessed directly by the host, or by a channel command the register's address is the sum of the system-defined channel base address and the register's offset value.

TABLE 1

| Channel register offsets | |
|---|---|
| Offset | Register |
| 0 | ChannelControl |
| 4 | ChannelStatus |
| 8 | CommandPtrHi |
| 12 | CommandPtrLo |
| 16 | InterruptSelect |
| 20 | BranchSelect |
| 24 | WaitSelect |
| 28 | reserved |
| 32 | Data2PtrHi |

TABLE 1-continued

| Channel register offsets | |
|---|---|
| Offset | Register |
| 36 | Data2PtrLo |
| 40 | reserved |
| 44 | AddressHi |
| 48 | BranchAddressHi |
| 52–60 | reserved |
| 64–124 | implementation dependent |

In summary, the functions of the mandatory registers are as follows: ChannelControl and ChannelStatus are used to control and observe the activity of the channel; CommandPtr is used to indicate where the channel's command list is located in memory. Detailed descriptions of the full register set are given below.

Figure 3:
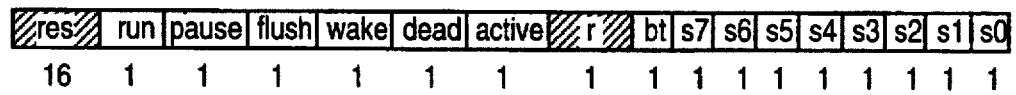
FIG. 3 is a diagram of the format of a ChannelStatus register.

The read-only ChannelStatus register provides access to the channel's internal status bits. The ChannelControl register bits are also visible through the ChannelStatus register. A write to the ChannelStatus register is ignored. The format of the ChannelStatus register is illustrated in FIG. 3.

As an overview, the run and pause bits are "control" bits which are set and cleared by software. The flush and wake bits are "command" bits which are set by software, and cleared by hardware when the action has been performed. The dead, active, and bt bits are hardware status bits. The bits s7 . . . s0 can be used for general purpose status and control. Their meaning is channel specific, and they can be controlled either by hardware or software.

The ChannelStatus.run bit is set to one by software to start execution by the channel. This should only be done after the CommandPtr registers are initialized. Otherwise, the operation of the channel is undefined. Software can clear this bit to zero to abort the operation of the channel. When channel operation is aborted data transfers are terminated, status is returned and an interrupt is generated. Data which is stored temporarily in channel buffers may be lost.

The ChannelStatus.pause bit is set to one by the software to suspend command processing. Hardware responds by suspending data transfers and command execution, and then clearing the ChannelStatus.active bit.

Software must reset ChannelStatus.pause to zero to allow command processing to resume.

The ChannelStatus.flush bit can be set to one by software to force a channel which is executing an INPUT_MORE or INPUT_LAST command to update memory with any data which has been received from the device, but has not yet been written to memory. When the memory update is complete, hardware updates the xferStatus and resCount fields in the current memory resident channel command (the fields of the channel command or descriptor are described below), then it clears the flush bit. Thus, a "partial" status update is characterized by a "1" in the flush bit of the xferStatus field, whereas the "final" status update is characterized by a "0" in this bit.

The ChannelStatus.wake bit is set to one by software to cause a channel which has gone idle to wake up, refetch the command pointed to by CommandPtr and continue processing commands. The channel becomes idle after executing a STOP command. The STOP command does not increment the CommandPtr register. ChannelStatus.wake is reset to zero by hardware immediately after each command fetch.

The ChannelStatus.dead bit is set to one by hardware when the channel halts execution due to a catastrophic event such as a bus-error or device error. The current command is terminated, and hardware attempts to write status back to memory. Further commands are not executed. If a hardwired interrupt signal is implemented, an unconditional interrupt is generated. When hardware sets ChannelStatus.dead, ChannelStatus.active is simultaneously deasserted. Hardware resets ChannelStatus.dead to zero when the run bit is cleared by software.

The ChannelStatus.active bit is set to one by hardware in response to software setting the run bit to one. ChannelStatus.active is reset to zero by hardware in response to software clearing the run bit or setting the pause bit. It is also reset to zero after a STOP command is executed and when hardware sets the dead bit to one.

The ChannelStatus.bt bit is set by hardware at the completion of the NOP, INPUT, and OUTPUT commands to indicate whether a branch has been taken. As described below, branching is governed by the Command.b field in the command descriptor, the ChannelStatus.s7 ... s0 bits and the values in the mask and value fields of the BranchSelect condition register. The presence of this bit in the Command.xferStatus field allows software to follow the actual channel program flow with minimal overhead.

Each DMA channel has up to eight general purpose state bits (ChannelControl.s7 ... ChannelControl.s0) which can be written through the channel control register and read through the ChannelStatus register. In some channel implementations it may be desirable to provide an additional method for setting and clearing these bits directly through hardwired connections. (For example when errors occur or to indicate the completion of a logical record.) These bits can be tested at the completion of each command in order to determine if certain actions should be taken. These actions include generation of a hardwired interrupt signal, suspension of further command processing, and branching to a new location for further command fetches.

Figure 4:
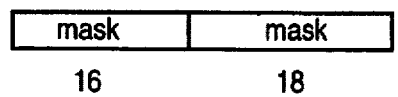
FIG. 4 is a diagram of the format of a ChannelControl register.

The format of the ChannelControl register is illustrated in FIG. 4. The ChannelControl register serves as the write port for the bits which are presented in the ChannelStatus register. The ChannelControl.mask field selects which of the lower 16 bits are to be modified by a write. Bits in the lower half of ChannelControl are only written if the corresponding bit in ChannelControl.mask is set.

The value in the ChannelControl.data field is conditionally written to the ChannelStatus register, based on the ChannelControl.mask field. Note that, as discussed above, certain of the bits of the ChannelStatus register are not writable or should only be written to the one state or to the zero state.

The CommandPtrHi and CommandPtrLo registers specify the address of the next command entry which is fetched. Since all channel commands are 16-byte aligned, the least-significant four bits of the CommandPtrLo register are always written with zeros. If these bits are written with a non-zero value, the operation of the channel is undefined. The value returned when these bits are read is undefined. The CommandPtr registers can be read at any time, but writes to the CommandPtr.registers are ignored unless the ChannelStatus.run and ChannelStatus.active bits are both zero.

Figure 5:
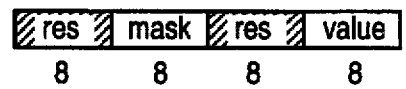
FIG. 5 is a diagram of the format of InterruptSelect, BranchSelect and WaitSelect condition registers.

The InterruptSelect condition register is used to generate the interrupt condition bit which is tested at the completion of each command to determine if a hardwired interrupt signal should be asserted. Its format is illustrated in FIG. 5.

The two 8-bit res fields are reserved. Software writes a zero value; hardware ignores the data value that is written. When the register is read, the values returned in these fields are undefined. The 8-bit mask and value fields affect the generation of interrupts when command descriptors are processed. An interrupt condition signal "c", which can be tested by each channel command, is generated according to the following equation:

c=(ChannelStatus.s7 ... s0 & InterruptSelect.mask)==(InterruptSelect.value & InterruptSelect.mask).

The BranchSelect condition register is used to generate the branch condition bit which is tested at the completion of each command to determine if a branch should be performed. The BranchSelect condition register has the same format as the InterruptSelect condition register. The branch condition signal is generated according to the following equation:

c=(ChannelStatus.s7 ... s0 & BranchSelect.mask)==(BranchSelect.value & BranchSelect.mask).

The WaitSelect condition register is used to generate the wait condition bit which is tested at the completion of each command to determine if command execution should be suspended. The WaitSelect condition register has the same format as the InterruptSelect condition register. The wait condition signal is generated according to the following equation:

c=(ChannelStatus.s7 ... s0 & WaitSelect.mask)==(WaitSelect.value & WaitSelect.mask).

The Data2PtrHi and Data2PtrLo registers specify the secondary 64-bit base-address for data-transfers from device-register space, from a second system memory space, or from channel registers.

The AddressHi register is used to extend the 32-bit Command.address field to 64 bits. In 64-bit implementations it should be loaded through a STORE_QUAD command preceding all data transfer commands. On the initial execution phase of a data transfer into an addressed destination, the value of AddressHi is loaded into the upper 32 bits of the channel's data buffer address register (DataPtrHi).

The BranchAddressHi register is used to extend the 32-bit Command.branchAddress field to 64 bits. In 64-bit implementations it should be loaded through a STORE_QUAD command preceding all commands which specify a branch. When the branch is taken, the value of BranchAddressHi is loaded into CommandPtrHi.

The general format of a command contains 16 bits of op-code fields (including a 4-bit cmd field), a 16-bit reqCount field, a 32-bit address parameter, and a 32-bit cmdDep parameter, as illustrated in FIG. 6. The xferStatus and resCount fields are used by the channel to report status after a command completes. Although the location and size of the cmdDep field is standardized for all commands, its interpretation is dependent on the Command.cmd value.

The Command.cmd field specifies which type of data transfer is performed, as defined in Table 2 and described below.

TABLE 2

| Command.cmd field values | | |
|---|---|---|
| value | name | description |
| 0 | OUTPUT_MORE | transfer more memory-to-stream |
| 1 | OUTPUT_LAST | transfer last memory-to-stream |
| 2 | INPUT_MORE | transfer more stream-to-memory |
| 3 | INPUT_LAST | transfer last stream-to-memory |
| 4 | STORE_QUAD | store immediate 4-byte value |
| 5 | LOAD_QUAD | load immediate 4-byte value |
| 6 | NOP | no data transfer |
| 7 | STOP | suspend command processing |
| 8–15 | — | reserved |

The Command.key field is used to select which of the device "access-ports" is used, as specified in Table 3.

TABLE 3

Command.key field effects

| Command.key | Name | description |
|---|---|---|
| 0 | KEY_STREAM0 | default device stream (data) |
| 1 | KEY_STREAM1 | device dependent stream (control & status) |
| 2 | KEY_STREAM2 | device dependent stream |
| 3 | KEY_STREAM3 | device dependent stream |
| 4 | — | reserved |
| 5 | KEY_REGS | channel-state register space |
| 6 | KEY_SYSTEM | system memory mapped space |
| 7 | KEY_DEVICE | device memory mapped space |

Figure 7:
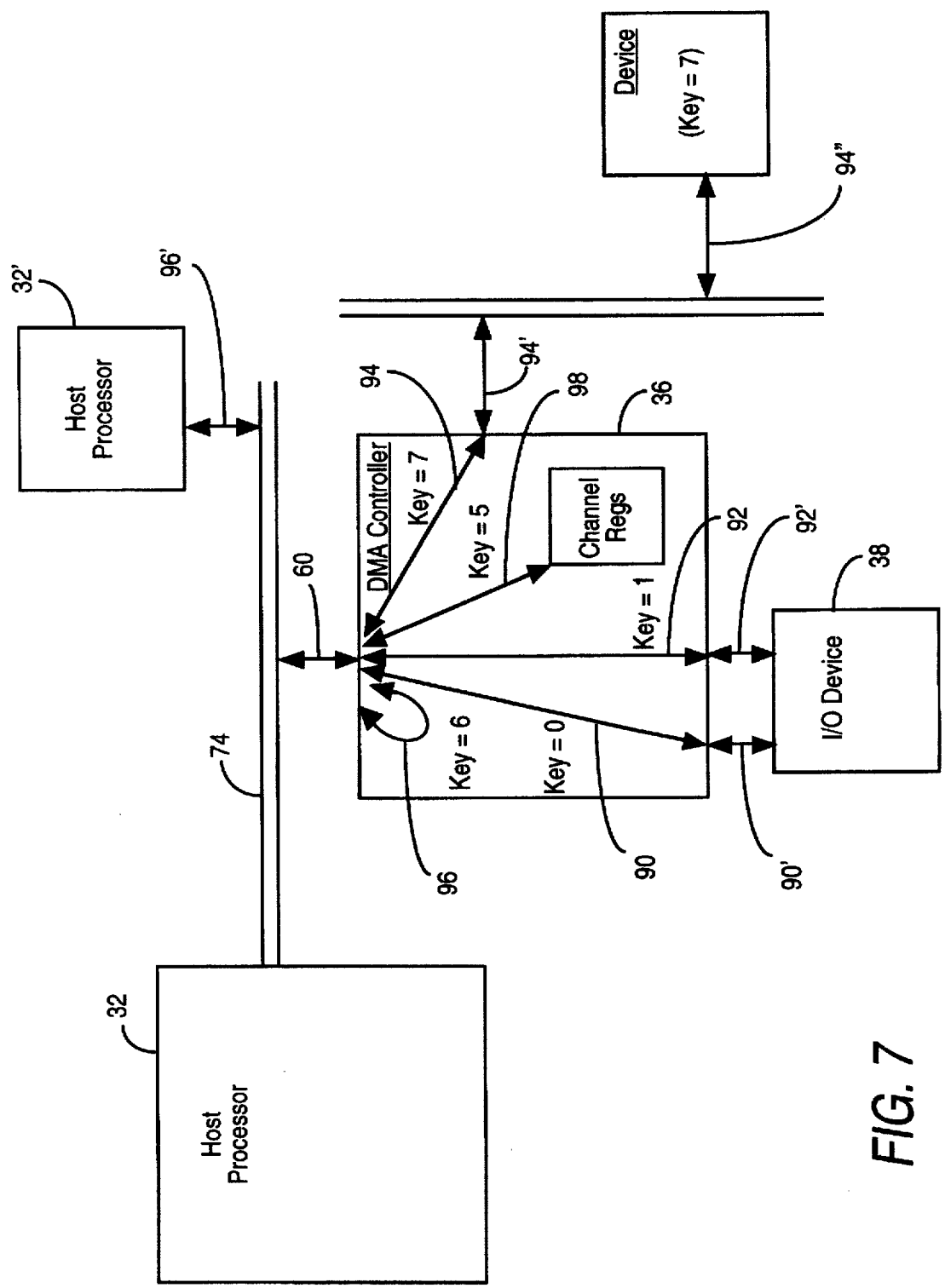
FIG. 7 is a schematic block diagram of the operation of the data port selection feature.

In INPUT and OUTPUT commands the key field may specify alternate device streams (e.g. data and status) as indicated by arrows 90, 90', 92 and 92' in FIG. 7, as well as alternate secondary address spaces when two-address transfers are to be performed (in conjunction with Data2Ptr which provides the address to be accessed) as indicated by arrows 94, 94' and 94" in FIG. 7. Transfers involving the system memory space 32, 32' as both source and destination may also be specified and performed as indicated by arrows 96 and 96' in FIG. 7. Finally, transfers involving the channel-state register space may be specified and performed as indicated by arrow 98 in FIG. 7.

In LOAD_QUAD and STORE_QUAD commands the key field specifies to which address space the immediate data is to be transferred. KEY_STREAM0 through KEY_STREAM3 are illegal in this context.

Table 4 summarizes the operation of the key field in combination with each of the data-transfer commands.

TABLE 4

Data transfer operations

| cmd | key | source | destination |
|---|---|---|---|
| OUTPUT | KEY_STREAM0..3 | SysMem(address) | Stream0..3 |
| " | KEY_SYSTEM | SysMem(address) | SysMem(Data2Ptr) |
| " | KEY_DEVICE | SysMem(address) | Device(Data2Ptr) |
| " | KEY_REGS | SysMem(address) | ChannelRegs(Data2Ptr) |
| INPUT | KEY_STREAM0..3 | Stream 0..3 | SysMem(address) |
| " | KEY_SYSTEM | SysMem(Data2Ptr) | SysMem(address) |
| " | KEY_DEVICE | Device(Data2Ptr) | SysMem(address) |
| " | KEY_REGS | ChannelRegs(Data2Ptr) | SysMem(address) |
| STORE_QUAD | KEY_STREAM0..3 | na | na |
| " | KEY_SYSTEM | data32 | SysMem(address) |
| " | KEY_DEVICE | data32 | Device(address) |
| " | KEY_REGS | data32 | ChannelRegs(address) |
| LOAD_QUAD | KEY_STREAM0..3 | na | na |
| " | KEY_SYSTEM | SysMem(address) | data32 |
| " | KEY_DEVICE | Device(address) | data32 |
| " | KEY_REGS | ChannelRegs(address) | data32 |

Upon completion of each command, a hardwired interrupt may optionally be generated. Interrupt generation is controlled by the 2-bit Command.i field in conjunction with an internal interrupt condition bit which is generated by the channel. The channel generates the interrupt condition based on the current values of the ChannelStatus.s7 ... s0 bits along with a mask and a data value found in the Interrupt Select condition register of each channel. The suggested algorithm for generating the interrupt condition is as follows:

$$c = (ChannelStatus.s7 \ldots s0 \text{ \& } InterruptSelect.mask) == (InterruptSelect.value \text{ \& } InterruptSelect.mask)$$

Note that in many implementations there will be no need to allow all of the general purpose status bits to generate interrupts. In these cases, the generation of the interrupt condition may be as simple as tying it to a single status bit, or tying it to zero. The equation above should be used in those cases where it is desired to allow interrupts to be generated based on the values of multiple status bits.

Table 5 indicates how the interrupt condition bit is used in conjunction with the Command.i field to determine whether to generate an interrupt.

TABLE 5

Command.i field effects

| Command.i | interrupt condition |
|---|---|
| 0 | never interrupt |
| 1 | interrupt if the interrupt condition bit is true |
| 2 | interrupt if the interrupt condition bit is false |
| 3 | always interrupt |

Upon completion of each command, further command fetching may optionally be suspended. This is controlled by the Command.w field in conjunction with an internal wait condition bit which is generated by the channel interface. The channel interface generates the wait condition based on the current values of the ChannelStatus.s7 ... s0 bits along with a mask and a data value found in the WaitSelect condition register of each channel. The algorithm for generating the wait condition is as follows:

$$c = (ChannelStatus.s7 \ldots s0 \text{ \& } WaitSelect.mask) == (WaitSelect.value \text{ \& } WaitSelect.mask)$$

Table 6 indicates how the wait condition bit is used in conjunction with the Command.w field to determine whether to suspend command execution.

TABLE 6

| Command.w | wait condition |
|---|---|
| | Command.w field effects |
| 0 | never wait |
| 1 | wait if the wait condition bit is true |
| 2 | wait if the wait condition bit is false |
| 3 | always wait |

Upon completion of most commands (INPUT_MORE/LAST, OUTPUT_MORE/LAST and NOP), the CommandPtr is updated to point to either the next command or the target of a branch. Branching is controlled by the Command.b field in conjunction with an internal branch condition bit which is generated by the channel. The channel generates the branch condition based on the current values of the ChannelStatuS.s7 ... s0 bits along with a mask and a data value found in the BranchSelect condition register of each channel. The algorithm for generating the branch condition is as follows:

c=(ChannelStatus.s7 ... s0 & BranchSelect.mask) ==(BranchSelect.value & BranchSelect.mask)

Table 7 indicates how the branch condition bit is used in conjunction with the Command.b field to determine whether to take the branch.

TABLE 7

| Command.b | branch condition |
|---|---|
| | Command.b field effects |
| 0 | never branch |
| 1 | branch if the branch condition bit is true |
| 2 | branch if the branch condition bit is false |
| 3 | always branch |

The branch condition is evaluated and the CommandPtr is updated immediately upon completion of the command.

The Command.reqCount field is used to specify the number of bytes to be transferred by the data-transfer commands.

The Command.address field is used to specify the primary 32-bit address (or the least-significant portion of a 64-bit address) used in data transfers. In INPUT and OUTPUT commands, it is always a system memory address, and points to a data buffer. In LOAD_QUAD and STORE_QUAD commands, it is the address from or to which the immediate data is to be loaded or stored. In this case, it may point to system memory space, device memory space, or the channel registers, as controlled by the Command.key field.

The meaning and format of the 32-bit Command.cmdDep field is dependent on the Command.cmd values. In STORE_QUAD and LOAD_QUAD commands it is the data value to be written or read. In input and output commands it is used to specify a 32-bit conditional branch target (or the least-significant portion of a 64-bit branch target). See the descriptions of the individual commands below.

Upon completion of the command, the current contents of the channel's ChannelStatus register is written to the Command.xferStatus field. The format of the ChannelStatus register was described above. When Command.xferStatus is written to memory, the bit corresponding to ChannelStatus.active is always set to one. This serves as an indication that the corresponding command has been executed, and both the xferStatus and a resCount fields have been updated. In order to make use of this feature, host software should initialize this bit to zero in the xferStatus field.

For INPUT commands, the ChannelControl.flush bit provides a mechanism for software to force buffered data to be written to memory, and status to be updated prior to the completion of the command. Partial status reports are characterized by the flush bit being set to one in the xferStatus field.

Some devices may wish to provide intermediate status autonomously, identifying how many data bytes have been transferred, before completing the command-descriptor specified transfers. This may be accomplished by providing the device with the ability to set the flush bit in the ChannelControl register. The intermediate-status reports may be useful in cases such as terminal input, where the host needs to respond quickly to input data, but would like to avoid interrupts on every byte.

The intermediate-status capability is an optional device-dependent capability. When implemented, the conditions under which partial status is returned are device-dependent; for example, it could be done periodically, when signaled through device-dependent state bits, whenever a minimum number of data bytes were available, or combinations of these conditions.

Upon completion of the command, the 16-bit residual byte-count value is written to Command.resCount. This value is normally zero, but may be more when the device prematurely terminates the data-transfer.

The Command.resCount and Command.xferStatus fields are updated in an indivisible operation.

The INPUT_MORE, INPUT_LAST, OUTPUT_MORE, and OUTPUT_LAST commands transfer data between memory and the device stream. The OUTPUT_MORE and OUTPUT_LAST commands transfer data from system memory (which typically goes into the attached device). The INPUT_MORE and INPUT_LAST commands transfer data (which typically comes from the attached device) into memory. Data chaining is accomplished through the use of the "MORE" and "LAST" versions of these commands. The "MORE" commands indicate that the current buffer is not expected to complete a logical record (such as a network packet). The "LAST" commands indicate that the buffer is expected to complete a logical record. The reqCount field specifies the number of bytes to be transferred, the address field specifies a starting system memory address, and the branchAddress field specifies the address from which to fetch the next command if the branch test is successful, as illustrated in FIG. 8. The Command.key field is used to select which of the device "access-ports" is used.

An OUTPUT or INPUT command which performs a conventional transfer between system memory and an unaddressed device stream, should specify a Command.key value of KEY_STREAM0. Additional stream identifiers allow access to other streams which may be provided by the device, such as control/status information. Command.key values of KEY_SYSTEM and KEY_DEVICE are used in conjunction with an (optional) Data2Ptr register to perform two-address transfers between-system memory and the specified space.

In 64-bit implementations, the upper 32 bits of the buffer address are loaded with the value of the AddressHi register, and the command is always preceded with a STORE_QUAD command which sets AddressHi to the appropriate value.

Figure 9:
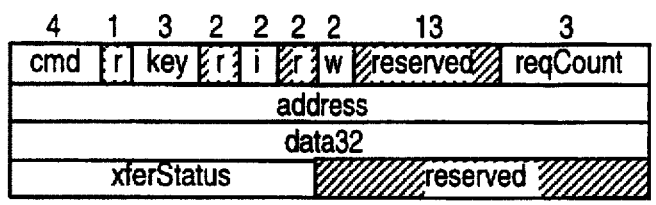
FIG. 9 is a diagram of the format of the STORE_QUAD command.

The STORE_QUAD command stores a 32-bit immediate value into memory. The 32-bit data32 field specifies the data value, and the address field (in combination with the key field) specifies the destination address, as illustrated in FIG. 9.

The field normally used for specifying whether a branch is to be taken (Command.b) is reserved in this command and is to be written with a zero value. The operation of the channel is undefined when a non-zero value is written to this field.

The only valid values for the reqCount field are 1, 2 or 4. Only aligned transfers are supported so, for example, if the count is four, the low-order two bits of the address are assumed to be zero, and are ignored. Likewise, if the count is two, the low-order bit of the address is assumed to be zero. When the count is less than four bytes, the least significant bytes of data32 are transferred.

Illegal counts are mapped into legal ones as illustrated in Table 8. (An "x" represents a "don't care" bit).

TABLE 8

| Effective count values (STORE_QUAD) | |
|---|---|
| reqCount (binary) | effective count |
| 1xx | 4 |
| 01x | 2 |
| 00x | 1 |

During the execution of a STORE_QUAD command the Command.key value specifies the destination address for the immediate data. Only key values of KEY_REGS, KEY_SYSTEM, and KEY_DEVICE are allowed. The operation of the channel is undefined when other key values are used.

Figure 10:
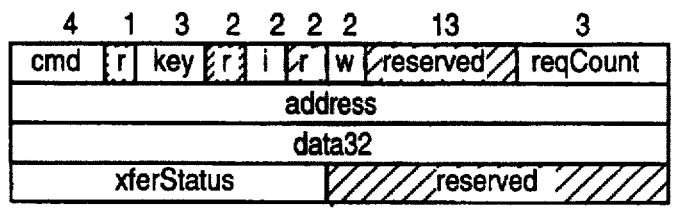
FIG. 10 is a diagram of the format of the LOAD_QUAD command.

The LOAD_QUAD command loads a 32-bit immediate value from memory. The 32-bit data32 field is the destination and the address field (in combination with the key field) specifies the source address, as illustrated in FIG. 10.

The field normally used for specifying whether a branch is to be taken (Command.b) is reserved in this command. Software writes this field with a zero value. The operation of the channel is undefined when a non-zero value is written to this field.

The size and alignment of data transfers are handled in the same way as for the STORE_QUAD command.

During the execution of a LOAD_QUAD command the Command.key value specifies the source address for the immediate data. Only the key values of KEY_REGS, KEY_SYSTEM, and KEY_DEVICE are allowed. The operation of the channel is undefined when other key values are used.

Figure 11:
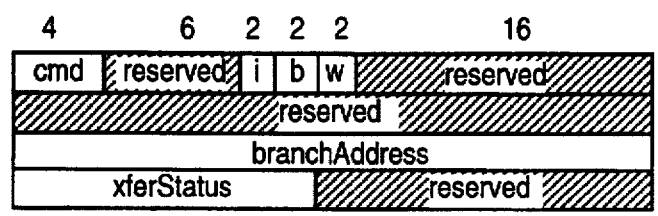
FIG. 11 is a diagram of the format of the NOP command.

The NOP command performs no data transfers. However, it can use the standard mechanisms to specify that the interrupt, branch, or wait actions be performed. The NOP command is illustrated in FIG. 11.

Figure 12:
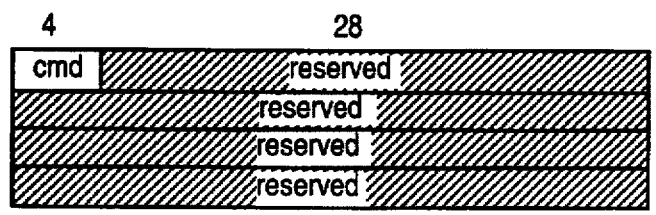
FIG. 12 is a diagram of the format of the STOP command.

The STOP command deactivates channel processing. It is placed at the end of a command list to indicate that there are currently no further commands to be processed. The only effect of the STOP command is that the channel goes idle, and clears the ChannelStatus.active bit. The format of the STOP command is illustrated in FIG. 12.

In order to add additional commands to an active channel program, the following sequence should be performed: 1) Append the new commands to the existing channel program in memory. 2) Overwrite the STOP command with a branch command. 3) Set the wake bit in the ChannelControl register to one. This allows the channel to process the new commands whether or not it had already completed the old commands and gone idle.

Figure 13:
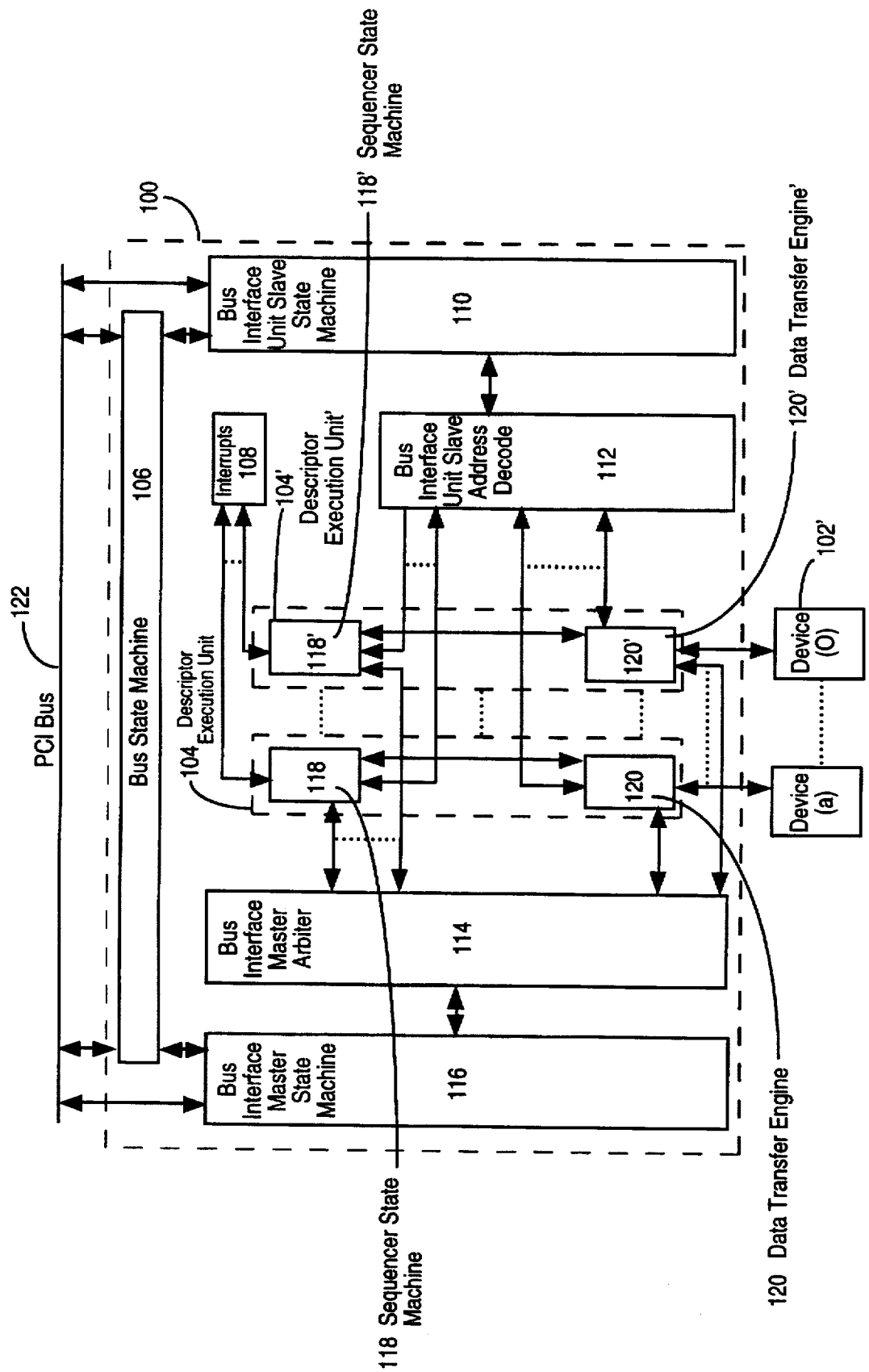
FIG. 13 is a schematic block diagram of an implementation of a DMA controller according to the present invention.

FIG. 13 is a block diagram of an implementation of a DMA controller 100 and its attached devices of which 102 and 102' are shown. Each channel includes its own descriptor execution unit of which 104 and 104' are shown. The other elements 106, 108, 110, 112, 114 and 116 are necessary to interface the DMA logic to a particular bus 122. Each block on the diagram will be discussed separately.

Each descriptor execution unit of which 104 and 104' are shown includes a sequencer state machine of which 118 and 118' are shown and a data transfer engine of which 120 and 120' are shown. As discussed in greater detail below, the sequencer state machine is responsible for fetching the current channel command, parsing the command, executing or dispatching the command to the data transfer engine, testing the conditional action bits controlled by the data transfer engine and the conditional action fields of the command, and returning status for the command.

As discussed in greater detail below, the data transfer engine executes the data transfer commands OUTPUT_MORE, OUTPUT_LAST, INPUT_MORE or INPUT_LAST. These commands move data to or from an unaddressed data stream from or to an addressed stream. Typically the unaddressed stream is to or from an attached device and the addressed stream is a 32 bit address found in the system memory space.

The bus interface master state machine 116 receives transfer requests from the sequencer state machines and data transfer engines. A transfer request includes information regarding the size, direction, and type of request to be performed. The bus interface master state machine then works in conjunction with the bus state machine 106 to arbitrate and execute the desired bus cycle. Upon completion of the transfer request, the bus interface master state machine signals completion of the transaction by acknowledging the request.

The bus interface master arbiter 114 arbitrates and multiplexes the transfer requests and qualifying signals from all of the sequencer state machines and data transfer engines down to a single request and presents this request to the bus interface master state machine 116. Bus interface master arbiter 114 also demultiplexes a transfer acknowledge signal from the bus interface master state machine to the current requester. This design partitioning was chosen to enable the design of the bus interface master state machine to be independent of the number of requesting channels.

The bus state machine 106 controls the signaling protocol of the system bus which could for example be the Peripheral Component Interconnect (PCI) bus. Refer to the "PCI Local Bus Specification" revision 2.0.

The interrupts module 108 contains four registers and associated control logic. Three types of interrupts are supported: DMA channel interrupts, device interrupts and external interrupts. DMA channel interrupts are controlled by the interrupt condition field found in the descriptor or command (see above discussion). Device interrupts are generated by attached devices such as a serial communications controller. External interrupts are generated from external sources unrelated to the DMA controller's I/O functions, such as slot interrupts from other on-board PCI devices.

The bus interface unit slave state machine module 110, together with the bus state machine module 106, service the PCI slave requests that are targeted for this ASIC. See above-mentioned "PCI Local Bus Specification" revision 2.0. These requests fall into two categories, configuration cycles and memory cycles. The configuration cycles are accepted by the bus interface unit slave state machine module and access the configuration registers contained in the module. The memory cycles are passed on to the bus interface unit slave address decode module 112 and target a register somewhere else in the design.

When KEY_DEVICE is specified in the key field of the descriptor, the DMA controller initiates I/O bus cycles instead of memory bus cycles.

The bus interface unit slave address decode module 112 decodes and demultiplexes requests that have been received from the bus interface unit slave state machine module 110 which received them as memory cycles from the PCI bus 122. When a request is received from the bus interface unit slave state machine module, the associated address is decoded and the request is forwarded to the appropriate slave. In the block diagram of FIG. 13, the target of the request could be a register contained in a sequencer state machine, data transfer engine, or interrupt module. Bus interface unit slave address decode module 112 also multiplexes the acknowledge and read data signals returned from the appropriate slave and presents it to the bus interface unit slave state machine module.

Upon fetching a command, the sequencer state machine "parses" the command. If the command is not a data transfer command (i.e. the command is a STORE_QUAD, LOAD_QUAD, NOP or STOP command), the sequencer state machine is responsible for executing the command. If the command is a data transfer command (OUTPUT_MORE, OUTPUT_LAST, INPUT_MORE, or INPUT_LAST) the sequencer state machine transfers control to the associated data transfer engine.

When execution of the command is complete (either by the sequencer state machine or the data transfer engine depending on the command) the sequencer state machine tests the conditional fields of the current command. The first field to be tested is the wait field. The sequencer state machine will not proceed from the current state until the wait condition tests false. Once the wait condition tests false, the sequencer state machine writes status back for the current command. Status information is written back to the last four bytes of the sixteen byte descriptor (command) structure. When the status write has completed, the sequencer state machine then tests the branch condition for the current command. If the branch condition tests false, the sequencer state machine increments the value in the command pointer register by sixteen to point to the next sequential descriptor. If the branch condition tests true, the sequencer state machine reads the branch address for the current command and writes this address to the command pointer register. The last condition to be tested is the interrupt condition. If the interrupt condition tests true, the sequencer state machine signals to the interrupt module to set the DMA channel interrupt for its channel.

Figure 14A:
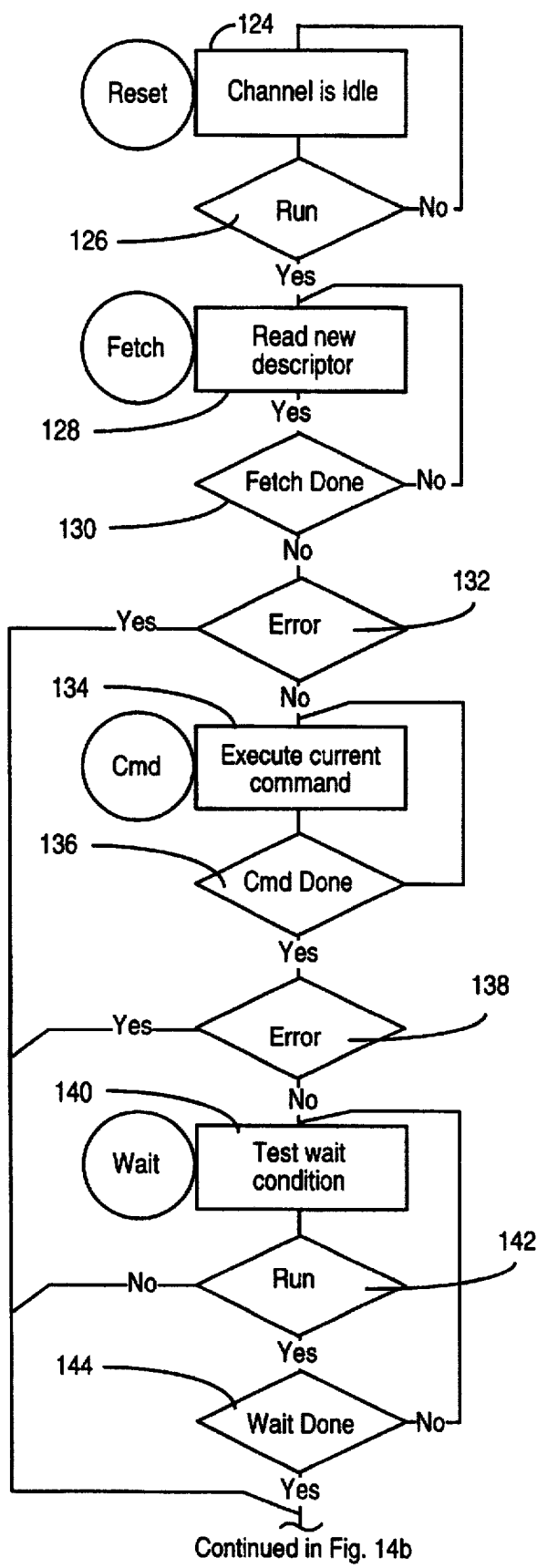
FIGS. 14A and 14B are contiguous portions of a flow chart of the operation of the sequencer state machines of FIG. 13.
Figure 14B:
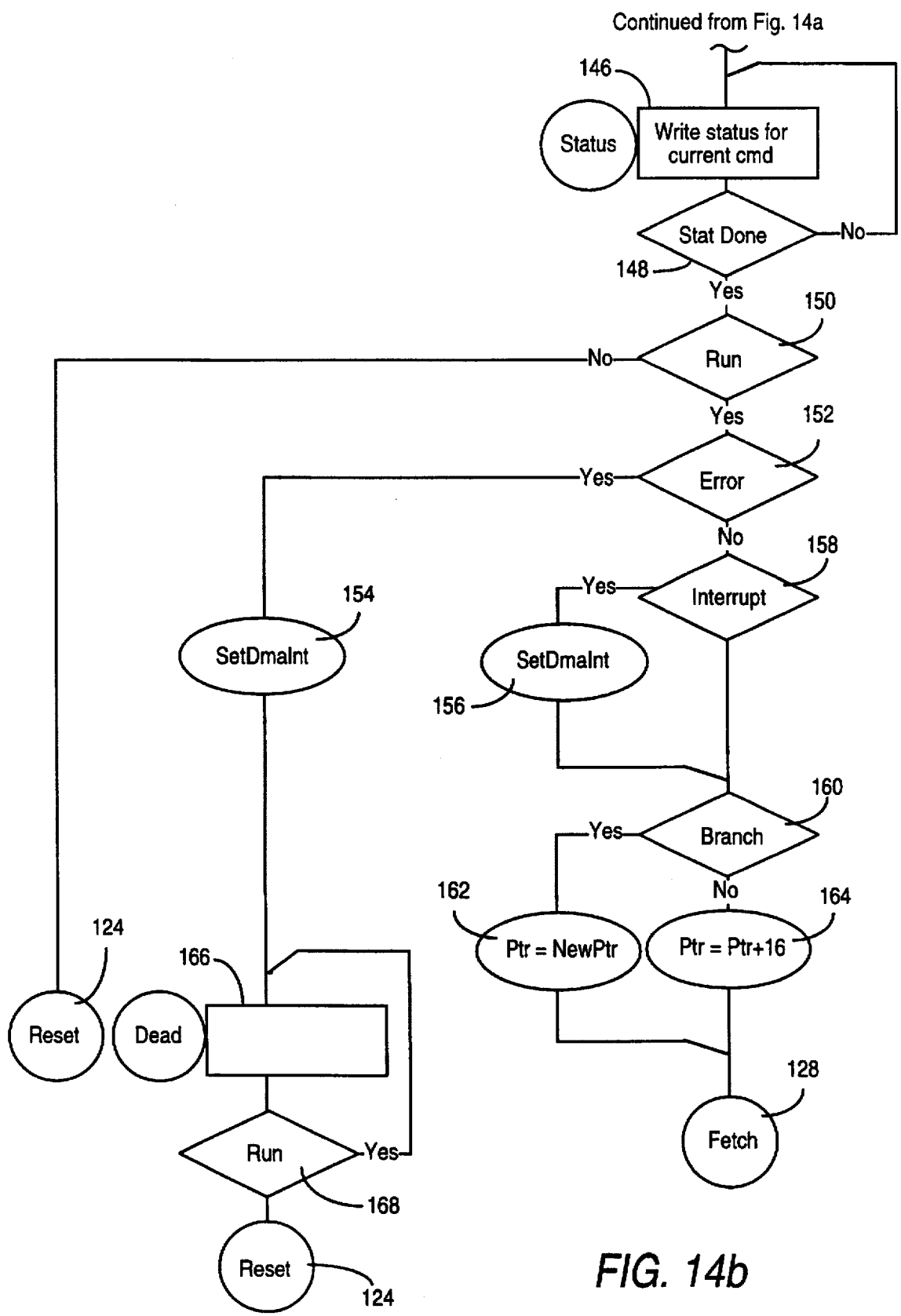

The behavior of the sequencer state machine is described by the flow chart of FIGS. 14A and 14B. The DMA channel powers up in the reset state 124 and is set in motion when the software writes a "one" to the "Run" bit in the ChannelControl register. This bit is tested at step 126 in FIG. 14A. The sequencer responds by fetching the descriptor pointed to by the CommandPtr register, as indicated by fetch step 128 and fetch done test 130. The occurrence of an error during the fetching of the command is tested for at test 132, and if an error occurred the control is transferred to status writing step 146 (FIG. 14B). Otherwise, the current command is executed as indicated by step 134. After test 136 indicates that command execution is complete, an error is tested for at test 138. Again, if an error occurred the control is transferred to status writing step 146. Otherwise, the wait condition is tested at step 140 and the run bit is tested at test 142. If the run bit is reset, the control is transferred to status writing step 146. Otherwise the wait done test 144 is performed and control transferred to test wait condition step 140 or status writing step 146 depending on the test results. When status is written as indicated by stat done test 148, the run bit is tested at test 150. If the run bit is reset, the channel goes into the reset state 124. Otherwise, a fatal device error is tested for at test 152. In case of error, an interrupt is generated at step 154 after which the channel goes into the dead state 166. If there is no error, the interrupt condition is tested at test 158, and, if true, an interrupt is generated at step 156. The branch condition is tested at test 160 and the command pointer is incremented by 16 (step 164) or set to the branch address (step 162) depending on the test result. In either case, fetch step 128 is executed next.

While the channel is in the dead state, the run bit is tested at test 168. When the run bit is reset, the channel goes into the reset state 124.

Possible data path selections of the key field are shown in FIGS. 15 and 16, which show different data transfer engine to I/O device interfaces, and the same sequencer state machine to bus interface. FIGS. 15 and 16 are block diagrams of a sequencer state machine 170 having command buffer 176 with key field 178, a data transfer engine 172 having command buffer 180 with key field 182 and FIFO 186, and I/O device 174. In both FIGS. 15 and 16, commands such as LOAD_QUAD are executed by sequencer state machine 170. The data is transferred to or from the bus interface (not shown) via lines 206 and lines 204 are used to specify the address space to be accessed. A combinational logic block 184 may be used to translate the encoding of key field 178 to the encoding used by the bus interface. (e.g. select I/O space, or configuration cycle).

Commands such as INPUT_MORE are executed by data transfer engine 172. At least part of the command to be executed is written to data transfer engine command buffer 180 via lines 202. FIFO 186 is connected to the bus interface via lines 200. In FIG. 15, device 174 has a single data input/output for all streams and a separate input for selecting a particular stream. The FIFO is connected to the data input/output via lines 188, and the stream information in key field 182 is conveyed to device 174 via lines 190. In FIG. 16, device 174 has separate input/outputs for separate streams, connected to lines 194 and 196. FIFO 186 is connected to lines 194 and 196 via multiplexer/demultiplexer 192 controlled by the value of key field 182 via lines 198.

Figure 17:
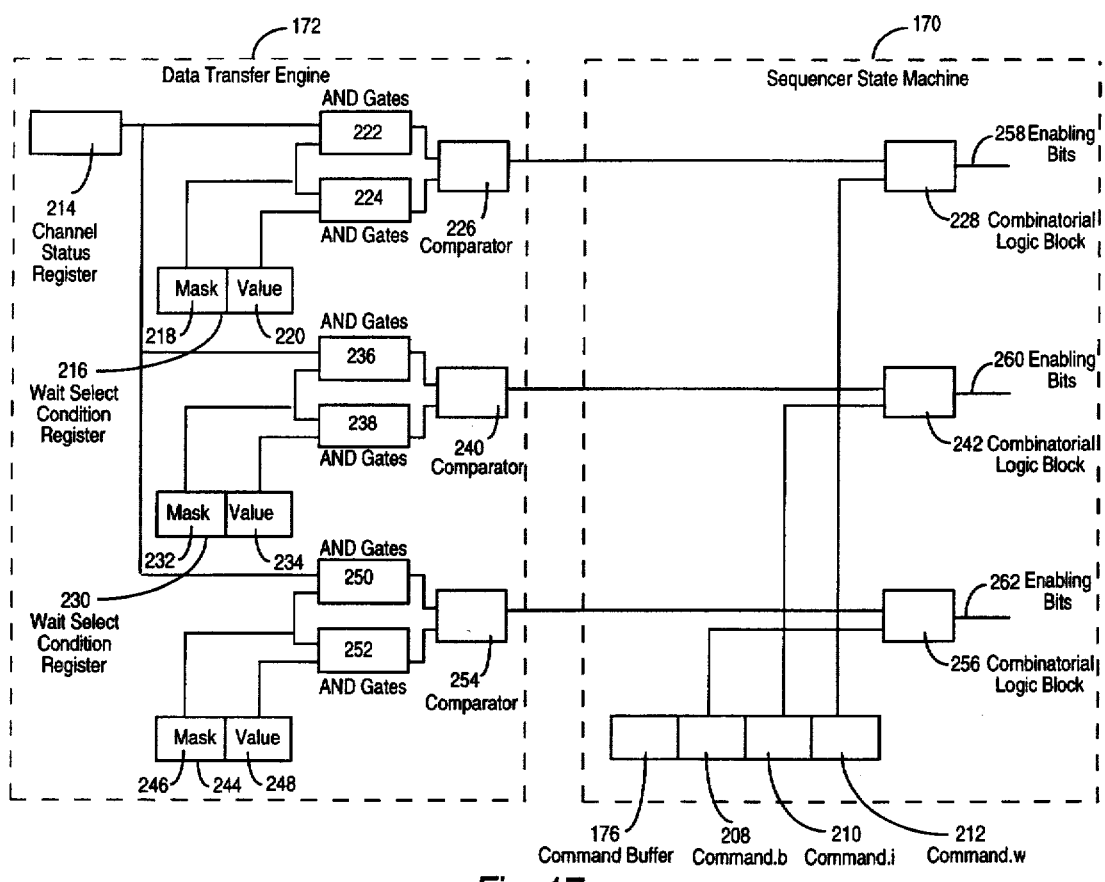
FIG. 17 is a schematic block diagram of an implementation of the conditional action features of the present invention.

FIG. 17 illustrates the implementation of the determination of the conditional action enabling bits 258, 260 and 262 for conditional wait, conditional interrupt and conditional branch, respectively. As shown, command buffer 176 of sequencer state machine 170 has conditional action fields Command.b 208, Command.i 210 and command.w 212. Data transfer engine 172 may include at least that portion 214 of ChannelStatus register that includes bits s7 ... s0 that affect conditional action execution as discussed above. Data transfer engine 172 may also contain WaitSelect condition register 216 having mask field 218 and value field 220, InterruptSelect condition register 230 having mask field 232 and value field 234, and BranchSelect condition register 244 having mask field 246 and value field 248.

The value of bits s7 ... s0 of ChannelStatus register 214 and the value of mask field 218 of WaitSelect condition register 216 are input to an array of AND gates 222 whose output is (ChannelStatus.s7 ... s0 & WaitSelect.mask). The value of mask field 218 of WaitSelect condition register 216 and the value of value field 220 of WaitSelect condition register 216 are input to an array of AND gates 224 whose output is (WaitSelect.value & WaitSelect.mask). The outputs of arrays 222 and 224 are input to comparator 226 whose one bit output is (ChannelStatus.s7 ... s0 &

WaitSelect.mask) ==(WaitSelect.value & WaitSelect.mask). This output is applied to combinational logic block 228 in sequencer state machine 170, together with the two bits of Command.w field 212. The truth table of logic block 228 is given in Table 9.

TABLE 9

Truth table for combinational logic block 228

| output of 226 | Command.w[0] | Command.w[1] | Signal 258 |
|---|---|---|---|
| x | 0 | 0 | 0 |
| 0 | 1 | 0 | 0 |
| 1 | 1 | 0 | 1 |
| 0 | 0 | 1 | 1 |
| 1 | 0 | 1 | 0 |
| x | 1 | 1 | 1 |

Bits 260 and 262 are obtained similarly, with elements 216, 218, 220, 222, 224, 226 and 228 corresponding to elements 230, 232, 234, 236, 238, 240, and 242 respectively, and to elements 244, 246, 248, 250, 252, 254 and 256, respectively.

Figure 18:
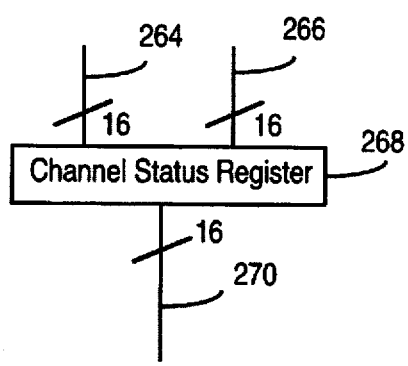
FIG. 18 is a schematic block diagram of an implementation of the control register masked write feature of the present invention.

FIG. 18 illustrates the implementation of the ChannelStatus register 268. The register is read using lines 270 corresponding to the address of the ChannelStatus register, and is written to using lines 266 corresponding to the data field of the ChannelControl address, to those bits enabled by lines 264 corresponding to the mask field of the ChannelControl address.

In summary, a DMA controller capable of conditional action under the control of a status register, prespecified parameters, and a condition field of the channel command, and a DMA controller which returns status information to command entry locations that are reserved for this purpose have been described. The present invention reduces the command entry size for conditional actions based on masked comparison and provides return of status information while allowing the command to be reused.

The present invention has been described in terms of a preferred embodiment. The invention, however, is not limited to the embodiment depicted and described. Rather, the scope of the invention is defined by the appended claims.

What is claimed is:

1. A direct memory access (DMA) controller comprising a channel including:

a status register;

a first condition register;

a command buffer having a first condition field;

a first combinational logic block having inputs connected to said status register, said first condition register and said first condition field and having an output whose value determines the conditional execution of a first action by said controller; and wherein said first combinational logic block includes a first subsystem having inputs connected to said status register and said first condition register and having an output, and a second subsystem having inputs connected to said first condition field and said output of said first subsystem, and an output which is the output of said first combinational logic;

said first condition field has two bits and four possible values, said values being used to determine whether said output of said second subsystem is one, zero, equal to said output of said first subsystem, or equal to the complement of the output of said first subsystem; and said first condition register has a mask field and a value field and the output of said first subsystem is one if and only if those bits of said status register corresponding to one bits of said mask field are equal to the corresponding bits of said value field.

2. The controller of claim 1 further including;

a second condition register;

a second combinational logic block having inputs connected to said status register, said second condition register and a second condition field of said command buffer and having an output whose value determines the conditional execution of a wait for said output of said second combinational logic block to take a predetermined value;

a third condition register;

a third combinational logic block having inputs connected to said status register, said third condition register and a third condition field of said command buffer and having an output whose value determines the conditional taking of a branch in a program executed by said DMA controller; and wherein said first action is an interrupt.

3. The controller of claim 1 or 2 wherein at least one bit of said status register may be set by hardware without external intervention.

4. The controller of claim 1 or 2 wherein at least one condition register is loadable through a command executed by the DMA controller.

* * * * *